UNITED STATES PATENT OFFICE.

HARRY H. PIERCE, OF INDIANAPOLIS, INDIANA, ASSIGNOR TO THE SCORIA PRODUCTS COMPANY, OF INDIANAPOLIS, INDIANA.

PLASTIC COMPOSITION.

1,404,162.   Specification of Letters Patent.   Patented Jan. 17, 1922.

No Drawing.   Application filed May 28, 1920.   Serial No. 384,825.

*To all whom it may concern:*

Be it known that I, HARRY H. PIERCE, a citizen of the United States, residing at Indianapolis, in the county of Marion and the State of Indiana, have invented a new and useful Plastic Composition, of which the following is the specification.

The object of this invention is to provide a wall plaster in which sand, as now commonly used, will be replaced by an equally durable material of approximately one half the weight of sand, bulk for bulk; which will be as sharp and keen as the best plasterers' sand; exceedingly porous whereby the fifty per cent reduction in weight is obtained, thereby making it commercially practicable to mix the ingredients by machinery at a factory where it can be done more thoroughly than with a hoe on the job, and then to ship it to the place of use; also, by reason of said reduction in weight, reducing the labor and consequent cost of construction and the weight afterwards to be carried by structure itself; and whereby the resulting air cells in the finished wall will produce an almost perfect nonconductor of sound and a very poor conductor of heat.

I accomplish the above, and other objects which will hereinafter appear, by the means now to be described.

The material used as a substitute for sand, and which is the foundation of my invention, is a by-product in the manufacture of pig iron, commonly known as the dross or slag. This is composed chiefly of lime and silica with other ingredients including a trace of iron. It floats to the top and is drawn off in a molten condition.

My treatment begins by disintegrating the molten slag by discharging a stream of cold water upon it as it discharges in liquid condition from the smelting furnace and the sudden chilling causes the material to fly to pieces in fragments ranging from the size of a marble down to very small granules. This product is additionally broken up by allowing it to fall into a tank of cold water.

After cooling, the comminuted material is spread upon a belt and the iron particles which would discolor the walls if plastered with a product containing them, are withdrawn by the attraction of an electro-magnet, after which the remaining product is graded by passing it over a screen with approximately an eighth of an inch mesh. All of the particles that are too large to go through the mesh of the screen are reduced in a crushing machine until they will. The porosity of this small granular product presents approximately a fifty per cent air space and it is quite evenly distributed among all of the particles.

The slag product in its smallest particles preserves its sharp edges and angles which are so necessary for a perfect bond in mortar and plaster, and my invention is applicable for brick-mortar and the like by the use of Portland and hydraulic cements or hydrated lime as a binder; and it is particularly well adapted for the construction of hollow building tiles made with gypsum as a binder because of the greatly reduced weight of resulting product.

I claim:

The method of producing a light, artificial sand from molten iron slag, which consists in subjecting molten slag to fluid treatment to solidify and disintegrate the same into a mass of heavy particles having iron content and light silicious particles having substantially no metallic content, removing the heavy particles having iron content from the light particles having substantially no metallic content, and then mechanically reducing the particles having substantially no metallic content to granular form.

In witness whereof I have hereunto set my hand at Indianapolis, Indiana, this 21st day of May, 1920.

HARRY H. PIERCE.